Figure 2:
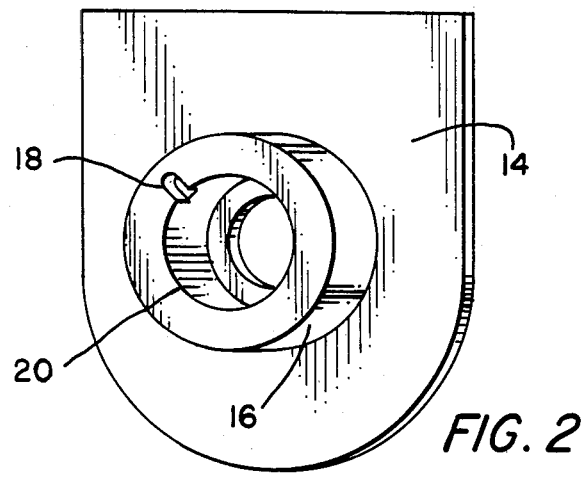

United States Patent [19]

Lewis et al.

[11] Patent Number: 4,643,439
[45] Date of Patent: Feb. 17, 1987

[54] SEAL FOR RELATIVELY ROTATABLE PARTS

[75] Inventors: Frederick Lewis, Nashua; Robert W. Munson, Pelham, both of N.H.

[73] Assignee: Ingersoll-Rand Company, Woodcliff Lake, N.J.

[21] Appl. No.: 783,176

[22] Filed: Oct. 2, 1985

[51] Int. Cl.⁴ .............................................. F16J 15/32
[52] U.S. Cl. ...................................... 277/95; 277/71; 277/101; 277/152
[58] Field of Search ....................... 277/35, 39, 20, 19, 277/71, 74, 95, 152, 101

[56] References Cited

U.S. PATENT DOCUMENTS

| | | | |
|---|---|---|---|
| 2,132,249 | 10/1938 | Van Pelt | 277/95 X |
| 2,231,947 | 2/1941 | Rich | 277/95 X |
| 2,480,464 | 8/1949 | Gregoire | 277/35 X |
| 3,572,774 | 3/1971 | Sipler | 277/101 X |
| 3,615,097 | 10/1971 | Malmstrom | 277/95 |
| 4,188,039 | 2/1980 | Krisak et al. | 277/95 |
| 4,230,324 | 10/1980 | Derman | 277/74 |
| 4,461,487 | 7/1984 | Matsumoto | 277/74 |
| 4,573,692 | 3/1986 | Frank et al. | 277/101 X |

FOREIGN PATENT DOCUMENTS 2260039  8/1975  France ................................. 277/95

Primary Examiner—Allan N. Shoap
Attorney, Agent, or Firm—Frank S. Troidl

[57] ABSTRACT

The external seal is mounted on a housing about a rotary shaft projecting through an opening in the housing. The seal is a resilient, flexible member having a generally tubular body portion with an annular lip extending radially outwardly from one end of the body portion and a flange extending radially outwardly from the other end of the body portion. The lip extends into a sealing chamber formed by the outside of the housing and a replaceable sealing member which has an inside surface spaced from and parallel to the outside of the housing. The tubular portion of the seal extends through an annulus formed by the shaft and the replaceable member. The outwardly extending flange is used to prevent the clamp holding the seal to the shaft from falling out.

2 Claims, 2 Drawing Figures

SEAL FOR RELATIVELY ROTATABLE PARTS

This invention relates to seals adapted to provide a seal between a shaft and a housing having a surface extending transversely to the axis of rotation of the shaft. More particularly, this invention relates to radial lip seals.

In a radial lip seal the lip on the seal extends generally perpendicular to the axis of the rotary shaft being sealed. The radial lip seal is held on and rotates with the shaft. It usually seals against a ring or other member perpendicular to the shaft.

With conventional radial lip seals there are two major disadvantages. Firstly, there is no positive clamping action. The seal is stretched around the shaft and relies on the resilience of the seal material to maintain a clamping action. Secondly, when sealing against internal fluid or pressure, the major portion of the seal is exposed to the sealed material. In severe applications, the seal will suffer accelerated chemical attack and this will impair its clamping resilience. If a metal clamp is used with the seal, it would also be exposed to the material being sealed and accessibility would be difficult. Also, seal water cannot be effectively applied to conventional seals.

The seal of this invention has two main advantages over the conventional radial lip seal. Firstly, the seal will have and externally accessible metal clamp which will provide a positive mechanical hold and will not rely on the material resilience. Secondly, only the upper surface of the seal is exposed to the material sealed internally in the housing. Most of the seal is not exposed to the sealed material within the housing.

Briefly described an external replaceable member, a resilient flexiable seal, and a cylindrical clamp for securing the seal to the rotary shaft is used in combination with the rotary shaft. The replaceable member is positioned externally of the housing and mounted on the housing about the shaft. The replaceable member has a bore of larger diameter than the diameter of the shaft to provide a replaceable member-shaft annulus. The replaceable member has an inside surface which is parallel to and spaced from the housing outside wall to form a sealing chamber. The resilient flexible seal has a generally tubular body portion extending through the replaceable member-shaft annulus. The seal also has an integral annular thin flexible lip connected by a hinge at one axial end of the body portion. The lip is located within the sealing chamber and extends outwardly radially and axially toward the body portion. The radially outer portion of the inner surface of the lip is in sealing contact with the inside surface of the replaceable member. A clamp retaining flange extends radially outwardly from the other axial end of the body portion. A cylindrical clamp is mounted about the generally tubular body portion of the seal to secure the seal to the rotary shaft.

Figure 1:
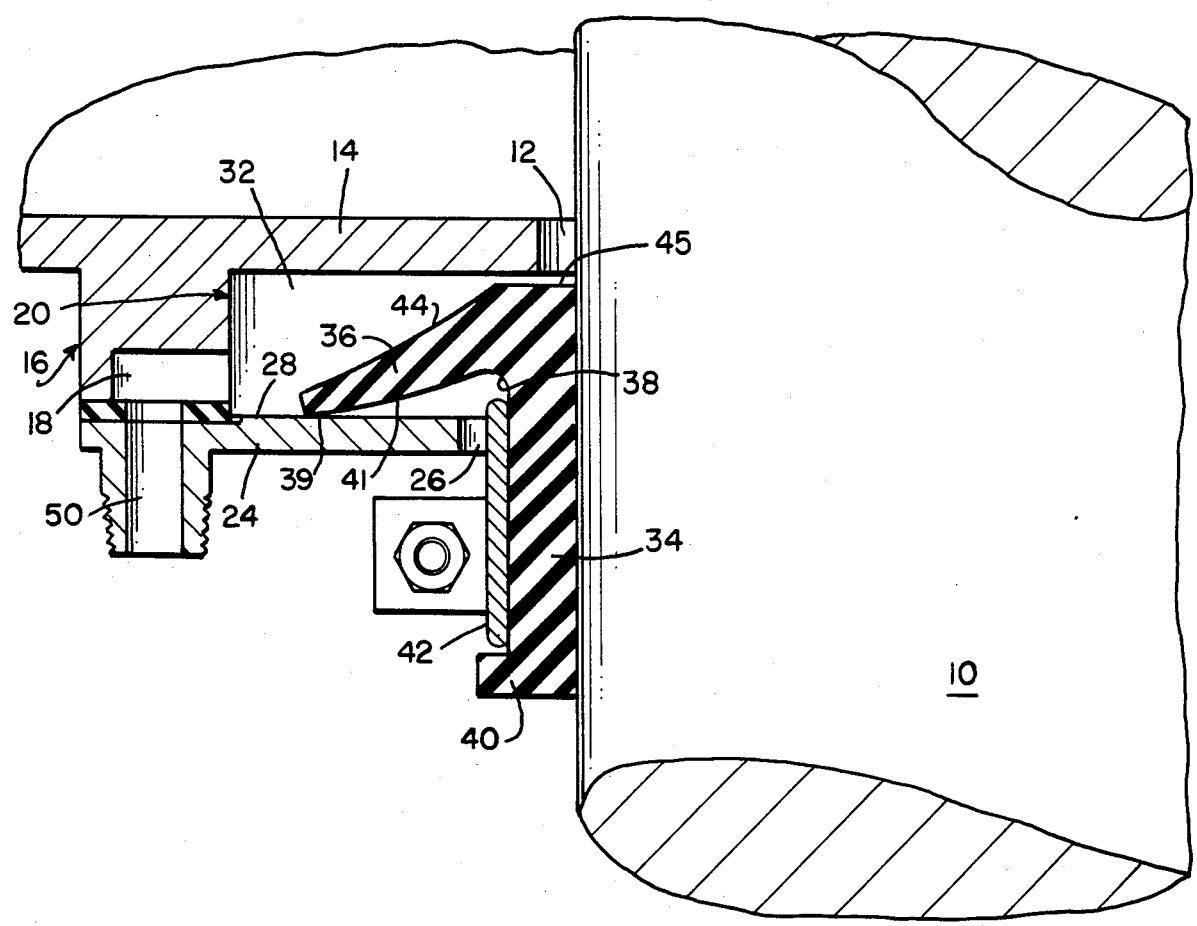

The invention, as well as its many advantages, may be further understood by reference to the following detailed description and drawing in which:

FIG. 1 is an elevational view, partly in section, showing one embodiment of the seal made in accordance with the present invention; and FIG. 2 is a bottom view on a smaller scale, of the housing wall and annular protrusion of FIG. 1.

In the various Figures, like parts are referred to by like numbers.

Referring to the drawing, and particularly to FIG. 1, a rotary shaft 10 extends through a bore 12 in the housing wall 14, which extends transversely from the rotary shaft 10. Housing wall 14 has an annular protrusion 16 extending outwardly from the housing. A small recess 18 (see FIG. 2) extends from the lower end of the protrusion part way into the protrusion. A counterbore 20 extends from the lower end of the protrusion to housing wall 14.

A replaceable external sealing ring 24 is mounted about the rotary shaft 10 and is connected to the protrusion 16 of the housing wall 14. The bore 26 in the center of the sealing ring has a larger diameter than the diameter of the shaft thus providing a sealing ring-shaft annulus.

The inside surface 28 of the sealing ring is spaced from and parallel to the housing wall 14 to form a sealing chamber 32.

A seal made of a resilient flexible material such as natural rubber, neoprene, viton, or Nitrile seals the material within the housing. The seal consists of a generally tubular body portion 34 extending through the sealing ring-shaft annulus, an integral annular thin flexible lip 36 connected by a hinge 38 at one axial end of the body portion 34 and a clamp retaining flange 40 extending radially outwardly from the other axial end of the body portion 34.

The annular lip 36 is located entirely within the sealing chamber 32 and extends outwardly radially and axially toward the body portion 34. The radially outer portion 39 of the inside surface 41 of the lip 36 is in sliding sealing contact with the inside surface 28 of the sealing ring. Note that the lip 36 is quite long compared to the length of the tubular body 34. The flexible lip extends radially from the bore of the seal at least three times the radial thickness of the tubular body 34. The radial extent of the lip 36 from the bore of the seal is more than one-half the total axial length of the seal.

A cylindrical clamp 42 is mounted about the generally tubular body 34 of the seal to secure the seal to the rotary shaft 10. Flange 40 of the seal retains the clamp 42 in position.

The metal clamp 42 will not slide off of the body of the seal because of the flange 40 on the seal.

In operation, the seal is mounted on and rotates with the shaft 10. The sealing lip keeps contact with the stationary replaceable sealing ring. Note that the entire structure of the seal except for the upper surface 44 of the sealing lip and the upper surface 45 of the tubular body 34 is external to the material to be sealed and therefore is not exposed to the material being sealed. Even deterioration of that external portion of the seal which is exposed to the fluid being sealed may be minimized by diluting the material being sealed with fresh sealing water which may be fed through fluid conduit 50 formed through the sealing ring 24, and through recess 18 into sealing chamber 32.

We claim:

1. In combination with a rotary shaft projecting through an opening in a housing having a housing wall extending transversely of said shaft: a replaceable member positioned outside of the housing and mounted on said housing about the shaft, said replaceable member having a bore of larger diameter than the diameter of the shaft to provide a replaceable member-shaft annulus, said replaceable member having an inside surface parallel to and spaced from said housing wall to form a sealing chamber; a seal of resilient flexible material having a generally tubular body portion extending through the replaceable member-shaft annulus, an integral annular thin flexible lip connected by a hinge at one axial end of the body portion, said annular lip being located within the sealing chamber and extending outwardly radially and axially toward the tubular body portion, the radially outer portion of the inner surface of said lip being in sealing contact with said inside surface of the replaceable member, and a clamp retaining flange extending radially outwardly from the other axial end of the body portion; and a cylindrical clamp mounted about the generally tubular body portion of the seal to secure the seal to the rotary shaft.

2. The combination of claim 1 wherein: said flexible lip extends radially from the bore of the seal at least three times the radial thickness of the tubular body of the seal.

* * * * *